(12) United States Patent  
Kamoshida et al.

(10) Patent No.: US 12,019,334 B2  
(45) Date of Patent: Jun. 25, 2024

(54) LIQUID CRYSTAL DISPLAY DEVICE

(71) Applicant: KYOCERA Corporation, Kyoto (JP)

(72) Inventors: Kenta Kamoshida, Chiba (JP); Ryo Tadauchi, Otsu (JP); Takashi Shimada, Otsu (JP); Kenji Ogura, Ritto (JP); Mitsuhiro Murata, Yao (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 17/921,937

(22) PCT Filed: Apr. 6, 2021

(86) PCT No.: PCT/JP2021/014663  
§ 371 (c)(1),  
(2) Date: Oct. 27, 2022

(87) PCT Pub. No.: WO2021/220738  
PCT Pub. Date: Nov. 4, 2021

(65) Prior Publication Data  
US 2023/0176422 A1    Jun. 8, 2023

(30) Foreign Application Priority Data  
Apr. 28, 2020  (JP) ................................ 2020-079554

(51) Int. Cl.  
G02F 1/13357     (2006.01)  
G02F 1/1333      (2006.01)  
G02F 1/1335      (2006.01)

(52) U.S. Cl.  
CPC .... G02F 1/13362 (2013.01); G02F 1/133302 (2021.01); G02F 1/133528 (2013.01);  
(Continued)

(58) Field of Classification Search  
None  
See application file for complete search history.

(56) References Cited

U.S. PATENT DOCUMENTS 5,757,443 A      5/1998   Kobayashi  
2006/0256260 A1  11/2006  Gon et al.  
(Continued)

FOREIGN PATENT DOCUMENTS

CN       1866061 A      11/2006  
JP       H9-113906 A     5/1997  
(Continued)

*Primary Examiner* — Richard H Kim  
(74) *Attorney, Agent, or Firm* — Procopio, Cory, Hargreaves & Savitch LLP (57) ABSTRACT

A liquid crystal display device prevents light leakage in a black display of a projected image when a light source reaches a higher temperature, and displays a high-quality image without any lost sense of reality. The device includes a light-transmissive liquid crystal display element including two glass substrates and a liquid crystal layer sealed between the glass substrates, a backlight device that emits light toward one glass substrate in the liquid crystal display element, an emission-light polarizing plate on the other glass substrate, an incident-light polarizing plate on the one glass substrate, and a polarizer being a plate and including a base layer including a glass substrate and a metal layer stacked on the base layer and having a polarization function. The polarizer is located with the base layer facing the incident-light polarizing plate. The base layer is thicker than each of the glass substrates.

18 Claims, 6 Drawing Sheets

(52) U.S. Cl.
CPC .. *G02F 1/133548* (2021.01); *G02F 1/133606* (2013.01); *G02F 2202/28* (2013.01); *G02F 2203/01* (2013.01)

(56) References Cited

U.S. PATENT DOCUMENTS

| | | | |
|---|---|---|---|
| 2011/0204295 A1* | 8/2011 | Kuwabara | C09B 57/008 |
| | | | 252/299.61 |
| 2015/0098029 A1 | 4/2015 | Sato et al. | |
| 2020/0041807 A1 | 2/2020 | Pastrik et al. | |
| 2020/0089043 A1 | 3/2020 | Moriwaki et al. | |

FOREIGN PATENT DOCUMENTS

| | | |
|---|---|---|
| JP | 2006-323351 A | 11/2006 |
| JP | 2009-222980 A | 10/2009 |
| JP | 2010-176879 A | 8/2010 |
| JP | 2013-228442 A | 11/2013 |
| JP | 2020-21066 A | 2/2020 |
| JP | 2020-42234 A | 3/2020 |

\* cited by examiner

LIQUID CRYSTAL DISPLAY DEVICE

TECHNICAL FIELD

The present disclosure relates to a liquid crystal display (LCD) device that can be used to, for example, project and display image light.

BACKGROUND OF INVENTION

A known technique is described in, for example, Patent Literature 1.

CITATION LIST

Patent Literature

Patent Literature 1: Japanese Unexamined Patent Application Publication No. 2013-228442

SUMMARY

In one or more aspects of the present disclosure, a liquid crystal display device includes a liquid crystal display element being light-transmissive and including two transparent substrates and a liquid crystal layer sealed between the two transparent substrates, an incident-light polarizing plate on one transparent substrate of the two transparent substrates in the liquid crystal display element, a light source that emits light toward the one transparent substrate in the liquid crystal display element, and a polarizer being a plate and located between the light source and the liquid crystal display element. The polarizer includes a base layer comprising glass and being thicker than each of the two transparent substrates. The polarizer includes a metal layer stacked on the base layer and facing the light source. The metal layer polarizes light.

Advantageous Effect

The LCD device according to the above aspect of the present disclosure prevents light leakage in a black display of a projected image that may occur as the light source, or also referred to as a backlight, reaches a higher temperature, and can display a high-quality image without any lost sense of reality. More specifically, the metal layer included in the polarizer receives light emitted from the backlight and receives radiant heat and transfers and diffuses the heat to components around the metal layer. The metal layer thus functions as a good thermal conductor and a good heat diffuser. The base layer included in the polarizer is thicker than each of the two transparent substrates and thus has higher heat capacity. The base layer receives light emitted from the backlight and receives radiant heat and effectively reduces the radiant heat transferred to the LCD element. The base layer thus also functions as a heat insulator. This structure can prevent light leakage in a black display on the LCD element that may occur as the backlight reaches a higher temperature and can thus prevent light leakage in a black display of a projected image projected using the LCD device.

BRIEF DESCRIPTION OF THE DRAWINGS

The objects, features, and advantages of the present disclosure will become more apparent from the following detailed description and the drawings.

DESCRIPTION OF EMBODIMENTS

A liquid crystal display (LCD) device according to one or more embodiments of the present disclosure will now be described with reference to the accompanying drawings.

The structure that forms the basis of an LCD device according to one or more embodiments of the present disclosure will now be described.

As augmented reality head-up displays (AR-HUDs) are widespread, display sizes have been larger and their backlights reach higher temperatures. Known techniques for reducing a temperature increase in an LCD device due to such a higher temperature backlight include a technique described in Patent Literature 1, with which the backlight has a luminance decreased by a predetermined degree.

The known technique described in Patent Literature 1 includes no mechanism for preventing light leakage in a black display in the LCD device that may occur as the backlight reaches a higher temperature. A projected image based on a black display with any local light leakage can thus have a largely lost sense of reality. A technique for avoiding this issue has been awaited.

Figure 1:
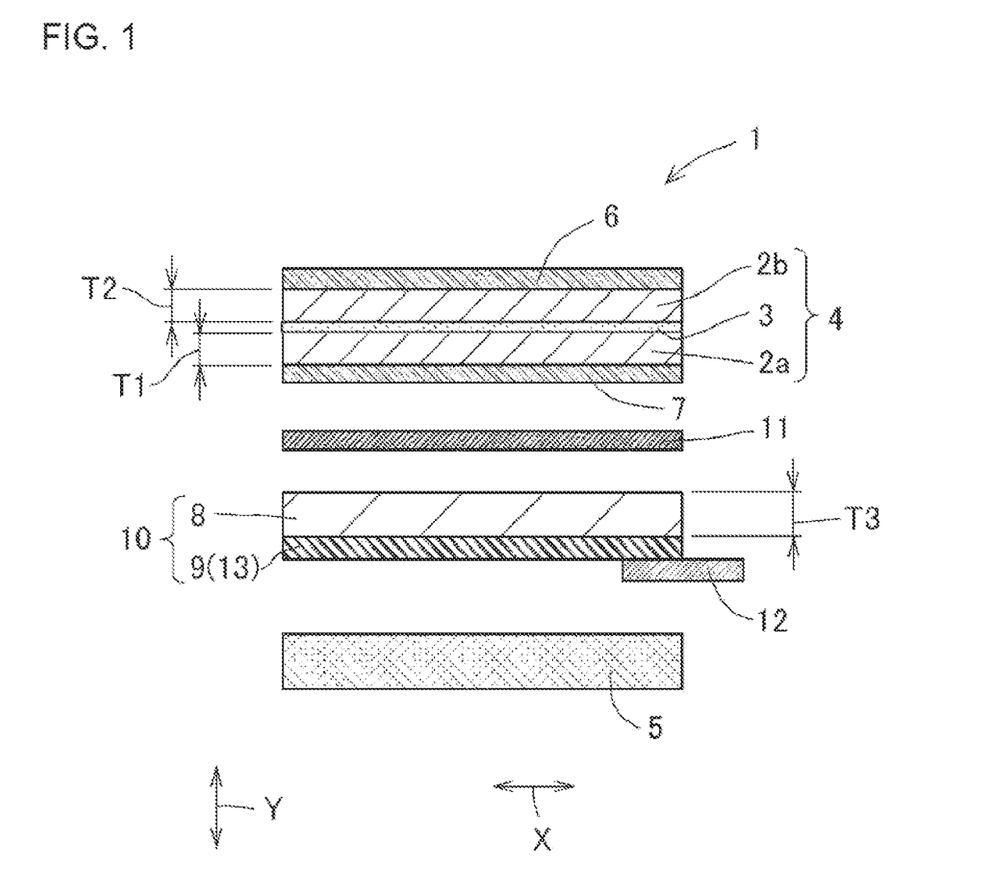
FIG. 1 is a schematic cross-sectional view of a liquid crystal display (LCD) device according to an embodiment of the present disclosure.

FIG. 1 is a schematic cross-sectional view of an LCD device 1 according to an embodiment of the present disclosure. For simplicity, FIG. 1 illustrates the LCD device 1 exploded in the thickness direction. In the present embodiment, the LCD device 1 includes a light-transmissive LCD element 4, a backlight device 5, an emission-light polarizing plate 6, an incident-light polarizing plate 7, and a polarizer 10 being a plate. The LCD element 4 includes glass substrates 2a and 2b as two transparent substrates and a liquid crystal layer 3 sealed between the two glass substrates 2a and 2b. The backlight device 5 emits light toward one glass substrate 2a in the LCD element 4 as a light source. The emission-light polarizing plate 6 is on the other glass substrate 2b in the LCD element 4. The incident-light polarizing plate 7 is on the one glass substrate 2a in the LCD element 4. The polarizer 10 includes a base layer 8 made of glass and a metal layer 9 stacked on the base layer 8 and having a polarization function. The polarizer 10 is located between the backlight device 5 and the LCD element 4 with the metal layer 9 facing the backlight device 5. The base layer 8 is thicker than each of the two glass substrates 2a and 2b.

The above structure produces the effects described below. The metal layer 9 included in the polarizer 10 receives light emitted from the backlight device 5 and receives radiant heat and transfers and diffuses the heat to components around the metal layer 9. The metal layer 9 thus also functions as a good thermal conductor and a good heat diffuser. The base layer 8 included in the polarizer 10, which has higher heat capacity, receives light emitted from the backlight device 5. This allows the base layer 8 to receive radiant heat and to effectively reduce the radiant heat transferred to the LCD element 4. The base layer 8 thus also functions as a heat insulator. This structure can prevent light leakage in a black display in the LCD element 4 that may occur as the backlight device 5 reaches a higher temperature and can thus prevent light leakage in a black display of a projected image projected by an image projector, such as an AR-HUD including the LCD device 1.

The transparent substrate included in the LCD element 4 may be a glass substrate, a transparent resin substrate, or a light-transmissive ceramic substrate. The transparent substrate may be a composite substrate including multiple types of substrates of a glass substrate, a transparent resin substrate, and a light-transmissive ceramic substrate stacked on one another. For example, for the transparent substrate being a composite substrate including a glass substrate and a transparent resin substrate stacked on each other, the glass substrate may be nearer the backlight device 5 and the metal layer 9, as glass has a thermal conductivity of 0.55 to 0.75 W/(m·K), which is higher than the thermal conductivity of a resin material being 0.12 to 0.29 W/(m·K). In this case, heat can be diffused more effectively by the metal layer 9, which also functions as a good thermal conductor and a good heat diffuser, and the glass substrate in contact with the metal layer 9. The glass substrate is suitable as it is easy to process, inexpensive, and highly transmissive. In the embodiments of the present disclosure described below, the LCD device 1 including the transparent substrates being glass substrates will be described.

The base layer 8 included in the polarizer 10 has higher heat capacity and thus reduces thermal effects on the LCD element 4. This also allows the two glass substrates 2a and 2b included in the LCD element 4 to be thinner.

The polarizer 10 is located with the metal layer 9 facing the backlight device 5. The metal layer 9 that also functions as a good thermal conductor and a good heat diffuser can thus effectively receive light emitted from the backlight device 5 and can effectively receive radiant heat.

The polarizer 10 includes the base layer 8 having a thickness T3 greater than a thickness T1 of the glass substrate 1a and a thickness T2 of the glass substrate 2b. The base layer 8, which also functions as a heat insulator, thus has higher heat capacity. The base layer 8 receives light emitted from the backlight device 5 and effectively stores radiant heat and provides insulation. In the present embodiment, the term insulate may not refer to completely blocking of heat transfer, and instead refers to insulation being provided with a degree to prevent light leakage in a black display on the LCD element 4. The thickness T1 of the glass substrate 2a and the thickness T2 of the glass substrate 2b are, for example, about 200 to 1000 μm. The thickness T1 of the glass substrate 2a and the thickness T2 of the glass substrate 2b may be the same or different from each other. The thickness T3 of the base layer 8 is selected to be greater than the greater one of the thicknesses T1 and T2 (or the thickness T1 or T2 when the thicknesses T1 and T2 are the same) and to be less than or equal to about five times the greater one of the thicknesses T1 and T2 (or the thickness T1 or T2 when the thicknesses T1 and T2 are the same). More specifically, the thickness T3 is selected to be greater than or equal to about twice the greater one of the thicknesses T1 and T2 (or the thickness T1 or T2 when the thicknesses T1 and T2 are the same) and to be less than or equal to about five times the greater one of the thicknesses T1 and T2 (or the thickness T1 or T2 when the thicknesses T1 and T2 are the same). With the thickness T3 greater than five times the greater one of the thicknesses T1 and T2 (or the thickness T1 or T2 when the thicknesses T1 and T2 are the same), the device is likely to be larger and heavier. A range of values referred to herein as one value to another value intends to mean the two values being inclusive.

The thickness T3 of the base layer 8 may be greater than the total of the thickness T1 of the glass substrate 2a and the thickness 12 of the glass substrate 2b (T1+T2). In this case, the base layer 8, which also functions as a heat insulator, has higher heat capacity. The base layer 8 receives light emitted from the backlight device 5 and effectively stores radiant heat and provides insulation. The polarizer 10 and the LCD element 4 stacked on each other greatly increase the mechanical strength of the LCD element 4.

For the thickness T1 of the glass substrate 2a and the thickness T2 of the substrate 2b different from each other, the thickness T1 of the glass substrate 2a nearer the backlight device 5 may be greater than the thickness T2 of the glass substrate 2b farther from the backlight device 5. In this case, the glass substrate 2a has higher heat capacity. The glass substrate 2a receives light emitted from the backlight device 5 and receives radiant heat and effectively reduces the radiant heat transferred to liquid crystal. The glass substrate 2a thus also functions as a heat insulator. The value of T1 may be greater than the value of T2 and may be less than or equal to about twice the value of T2. The value of T1 may not be within this range.

The polarizer 10 includes the base layer 8 made of glass. The base layer 8 may be, for example, a glass substrate. This allows light from the backlight device 5 to be transmitted toward the LCD element 4 moderately through glass that is light-transmissive. Glass contains chemically stable oxides such as silicon oxide ($SiO_2$), aluminum oxide ($Al_2O_3$), boric acid ($B_2O_3$), sodium oxide ($Na_2O$), potassium oxide ($K_2O$), and calcium oxide (CaO). Glass is thus less likely to be degraded by heat and can effectively store heat and provide insulation over a long period. In addition, glass has a thermal conductivity of 0.55 to 0.75 W/(m·K), which is higher than the thermal conductivity of a resin material being 0.12 to 0.29 W/(m·K). Glass thus has smaller thermal effects on the LCD element 4 than a resin material and is more likely to provide a uniform heat distribution as a whole.

The base layer 8 in the polarizer 10 being, for example, a glass substrate may be made of blue plate glass (soda glass) mainly containing $SiO_2$, $NA_2O$, and CaO. Blue plate glass has the lowest melting point of all types of glass, is easy to process, and is inexpensive. The base layer 8 being, for example, a glass substrate may be made of white plate glass (alkali-free glass) mainly containing $SiO_2$, $B_2O_3$, and $Al_2O_3$. White plate glass is inexpensive and has a high transmittance in the wavelength ranges of visible light, ultraviolet light, and infrared light. White plate glass typically has an upper temperature limit of 120 to 130° C. in normal use, which is equivalent to that of blue plate glass. The base layer 8 being, for example, a glass substrate may be made of quartz glass mainly containing $SiO_2$. Quartz glass is high purity glass with few impurities. Quartz glass has a high transmittance to ultraviolet light and infrared light and a high heat resistant temperature. Quartz glass has an upper temperature limit of about 900° C. in normal use. Quartz glass is highly resistant to chemicals and easily undergoes processing such as boring and cutting.

The base layer 8 in the polarizer 10 may be a sapphire glass ($Al_2O_3$ single crystal) substrate (also referred to as a sapphire crystal substrate). Sapphire glass has a Mohs hardness of as high as 9, a heat resistant temperature of about 2000° C., and a thermal conductivity of 42 W/(m·K) (at 20° C.), which is several tens of times the thermal conductivity of the glass being 1.4 W/(m·K) (at 20° C.).

The polarizer 10 may be spaced apart from the backlight device 5. In this case, the polarizer 10 is not in contact with the backlight device 5. The polarizer 10 thus does not directly receive heat from the backlight device 5 by thermal conduction. This reduces the likelihood that the polarizer 10 reaches abnormnally high temperatures.

When the polarizer 10 and the backlight device 5 have a spacing (spacing g1) between them, the spacing g1 may be, for example, about 0.1 to 10 mm. The value of the spacing g1 is not limited to this range. In this case, an air layer in the spacing g1 has a large volume, and thus has a greater heat insulation effect. The polarizer 10 is also less likely to receive heat from the backlight device 5 through radiant heat. The air in the air layer in the spacing g1 is also more likely to cause convection, thus facilitating heat transfer by convection. When the spacing g1 is greater than, for example, 10 mm, the LCD device 1 is likely to be larger. When the spacing g1 is less than, for example, 0.1 mm, the air layer in the spacing g1 has a small volume and thus has a less heat insulation effect. The polarizer 10 is also more likely to receive heat from the backlight device 5 through radiant heat. The spacing g1 may be about 1 to 5 mm.

The polarizer 10 may be spaced apart from the LCD element 4. In this case, the polarizer 10 is not in contact with the LCD element 4. The LCD element 4 thus does not directly receive heat from the polarizer 10 by thermal conduction. This reduces the likelihood that the LCD element 4 reaches abnormally high temperatures.

When the polarizer 10 and the LCD element 4 have a spacing (spacing g2) between them, the spacing g2 may be, for example, about 0.1 to 10 mm. The value of the spacing g2 is not limited to this range. In this case, an air layer in the spacing g2 has a large volume, and thus has a greater heat insulation effect. The air in the air layer in the spacing g2 is also more likely to cause convection, thus facilitating heat transfer by convection. When the spacing g2 is greater than, for example, 10 mm, the LCD device 1 is likely to be larger. When the spacing g2 is less than, for example, 0.1 mm, the air layer in the spacing g2 has a small volume, and thus has a less heat insulation effect. The spacing g2 may be about 1 to 5 mm.

A light diffuser 11 that diffuses light may be placed between the backlight device 5 and the incident-light polarizing plate 7. The light diffuser 11 causes light emitted from the backlight device 5 to be uniform and emitted toward the LCD element 4. The light diffuser 71 includes a plate-like base material made of a light-transmissive resin, such as a styrene methyl methacrylate copolymer resin (MS resin), a polystyrene resin (PS resin), a polycarbonate resin (PC resin), and a cyclo-olefin polymer resin (COP resin), mixed with a particulate light diffusing agent made of, for example, an acrylic resin or a silicone resin. In an example, the light diffuser 11 contains 85 wt % of an MS resin, 10 wt % of a PC resin, 2 wt % of a COP resin, and 3 wt % of a light diffusing agent made of an acrylic resin.

The light diffuser 11 receives light emitted from the backlight device 5. This allows the entire light diffuser it to uniformly receive radiant heat. The light diffuser 11 thus also functions as a heat uniformizer. The light diffuser 11 allows light emitted from the backlight device 5 to be uniform. The light diffuser 11 receives light emitted from the backlight device 5 and stores radiant heat, thus providing insulation. More specifically, light emitted from the backlight device 5 is repeatedly scattered in the light diffuser 11 and thus has an increased average optical path length in the light diffuser 11. Microscopically, photons collide with molecules of the resin material and molecules of the light diffusing agent in the base material in the light diffuser 11 and are elastically scattered repeatedly. This causes a part of the kinetic energy of the photons generated in collision to be transferred to the molecules of the resin material and the molecules of the light diffusing agent, thus increasing the amplitude and frequency of the lattice vibrations of the lattices (atoms) included in the molecules. This can increase the chance for a part of the kinetic energy of the photons to be converted to thermal energy in the resin material and the light diffusing agent as a whole.

The light diffuser 11 may be located between the backlight device 5 and the polarizer 10. In this case, the base layer 8 in the polarizer 10 including, for example, a glass substrate that has higher thermal conductivity and higher heat capacity than a resin material is nearer the LCD element 4 than the light diffuser 11 having the base material containing a resin material. This structure further reduces the thermal effects on the LCD element 4 and is more likely to provide a uniform heat distribution as a whole. This allows the heat distribution in the LCD element 4 to be more uniform.

The light diffuser 11 may be located between the backlight device 5 and the polarizer 10 with a spacing from the polarizer 10. In this case, the light diffuser 11 is not in contact with the polarizer 10. The polarizer 10 thus does not directly receive heat from the light diffuser 11 by thermal conduction. This reduces the likelihood that the polarizer 10 reaches abnormally high temperatures.

When the polarizer 10 and the light diffuser 11 have a spacing (spacing g3) between them, the spacing g3 may be, for example, about 0.1 to 10 mm. The value of the spacing g3 is not limited to this range. In this case, an air layer in the spacing g3 has a large volume, and thus has a greater heat insulation effect. The air in the air layer in the spacing g3 is also more likely to cause convection, thus facilitating heat transfer by convection. When the spacing g3 is greater than, for example, 10 mm, the LCD device 1 is likely to be larger. When the spacing g3 is less than, for example, 0.1 mm, the air layer in the spacing g3 has a small volume, and thus has a less heat insulation effect. The spacing g3 may be about 1 to 5 mm.

The light diffuser 11 may be located between the backlight device 5 and the polarizer 10 and in contact with the polarizer 10. In this case, the light diffuser 11 and the polarizer 10 are integral with each other, thus being a composite heat insulator with high heat capacity. The light diffuser 11 may be in contact with the polarizer 10 with, for example, a light-transmissive sheet, a light-transmissive film, or a light-transmissive resin adhesive in between. In this case, the light diffuser 11 and the polarizer 10 are integral with each other, thus being a composite heat insulator with higher heat capacity.

Figure 2:
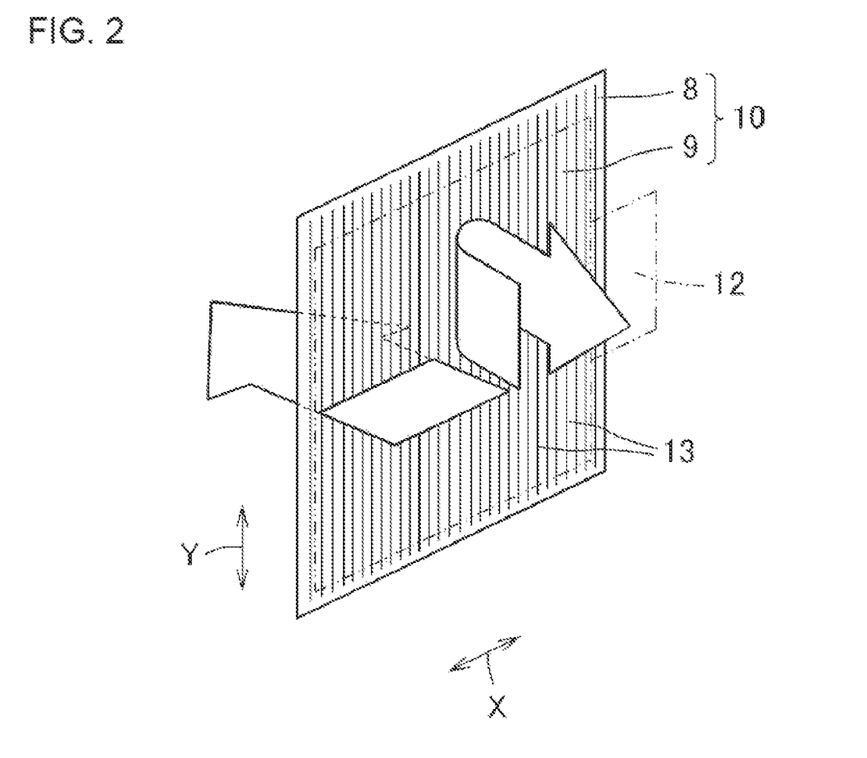
FIG. 2 is a schematic diagram of a polarizer, describing its polarization function.

The polarizer 10 includes the metal layer 9 having a polarization axis parallel to the polarization axis of the incident-light polarizing plate 7. The metal layer 9 includes a peripheral area to which conductive tape 12 is attached for higher heat dissipation. The metal layer 9 includes multiple thin metal wires (also referred to as a wire grid) 13 arranged in parallel with a spacing from one another, FIG. 2 is a schematic diagram of the polarizer 10, describing its polarization function. As described above, the polarizer 10 includes the base layer 8 and the metal layer 9. The base layer 8 may have a surface nearer the backlight device 5 having an uneven pattern including recesses and protrusions that are alternately located in a direction X in one plane and extend in a direction Y perpendicular to the direction X in another plane. Each of the recesses may be joined to one or more thin metal wires 13 described above. More specifically, the metal layer 9 may include the thin metal wires 13.

The thin metal wires 13 may contain at least one selected from the group consisting of Al, Ag, Cu, Ni, and Cr. More specifically, the thin metal wires 13 may be fine metal wires that are made of, for example, Al, Ag, Cu, Ni, or Cr (specifically, non-magnetic metal), made of a composition mainly containing these substances, or made of an alloy of, for example, Al, Ag, Cu, and Cr (specifically, non-magnetic metal) and has a diameter or a thickness of about 100 to 500 nm, or for example, about 250 nm. The thin metal wires 13 being such fine metal wires may be arranged parallel to one another at a pitch of about 100 to 200 nm, or for example, about 130 nm in a plane.

The thin metal wires 13 may be made of an Al alloy mainly containing Al, and the Al alloy may be duralumin (an Al—Cu alloy, an Al—Cu—Mg alloy, or an Al—Zn—Mg—Cu alloy). The thin metal wires 13 may be made of an Ag alloy mainly containing Ag (an Ag—Cu alloy). The thin metal wires 13 may be made of a Cu alloy mainly containing Cu (a Cu—Zn alloy, a Cu—Zn—Ni alloy, a Cu—Sn alloy, or a Cu—Sn—Zn alloy). The thin metal wires 13 may be made of an alloy containing Ni and Cr (an Ni—Cr alloy, an Ni—Cr—Fe alloy, or an Ni—Cr—Mo alloy). The thin metal wires 13 may be made of an Fe alloy mainly containing Fe (an Fe—Ni alloy, an Fe—Ni36 alloy or Invar, an Fe—Ni—Co alloy or Kovar, an Fe—Cr alloy, or an Fe—Cr—Ni alloy).

The thin metal wires 13 may be made of non-magnetic metal. When the thin metal wires 13 are made of magnetic metal that is easily magnetized by an external magnetic field such as a ferromagnetic material, in response to the thin metal wires 13 being magnetized by an external magnetic field, the plane of polarization of the linearly polarized light is rotated in accordance with the strength of a magnetic field generated by the thin metal wires 13. More specifically, the Faraday effect as one magneto-optical effect occurs. The rotation of the plane of polarization of the linearly polarized light passing through the polarizer 10 causes inconsistency with the crossed nicols conditions of the LCD element 4. This can easily cause deteriorating image quality, including reduced contrast on the LCD element 4.

The thin metal wires 13 may be made of paramagnetic metal as non-magnetic metal. Examples of the paramagnetic metal include aluminum (Al), chromium (Cr), molybdenum (Mo), titanium (Ti), and zirconium (Zr). The thin metal wires 13 may be made of diamagnetic metal as non-magnetic metal. Examples of the diamagnetic metal include gold (Au), silver (Ag), copper (Cu), and zinc (Zn). The thin metal wires 13 may be made of non-magnetic stainless steel that is less likely to be magnetized by an external magnetic field. The thin metal wires 13 may be made of: for example, completely non-magnetic brass (a Cu—Zn alloy) that is not magnetized by an external magnetic field.

The thin metal wires 13 may have a stacked structure including some of the various metal layers, the various alloy layers, and the various non-magnetic metal layers described above. For example, the thin metal wires 13 may have a structure including a Mo layer and a T1 layer having a high hardness stacked on the lower layer and/or the upper layer of an Al layer having high thermal conductivity and low hardness.

The inventors have identified the cause of the light leakage described below before proposing the LCD device 1 according to one or more embodiments of the present disclosure that can prevent or reduce the light leakage. The light leakage is caused by birefringence caused by the photoelastic effect of glass when the polarizing plate shrinks due to the surface temperature distribution across the surface nearer the light source. This is specific to the LCD element 4 that is driven in an in-plane switching (IPS) mode.

In the IPS mode, the backlight intensity is controlled by rotating liquid crystal molecules that are parallel to the surfaces of the glass substrates 2a and 2b facing each other. The liquid crystal molecules do not tilt in the vertical direction. Thus, the luminance and the color are less likely to change depending on the viewing angle, but the contrast ratio, luminance, and response speed are less likely to be increased. For the contrast ratio, a large amount of light leakage occurs on a black screen, thus failing to develop a jet-black color and increasing the luminance value in the black display. The contrast ratio (the luminance ratio of black and white) is thus also low. The luminance is difficult to increase due to low aperture efficiency. The response speed is difficult to increase due to the rotation method of the liquid crystal molecules. With the liquid crystals driven in the IPS mode, the response speed shows small variations across the entire gradation range, thus achieving the high-quality coloring properties and viewing angle characteristics.

The inventors have noticed that cooling the incident-light polarizing plate 7 and reducing the surface temperature distribution in the incident-light polarizing plate 7 can reduce shrinking of the incident-light polarizing plate 7, and thus examined the material for the polarizer 10. Table I shows the thermal conductivity of the base layer 8 in the polarizer 10, a metal layer A, and a metal layer B. The base layer 8 is a glass substrate. The metal layer A is made of ITO. The metal layer B is made of Al. These materials seem unlikely to greatly affect the optical characteristics.

TABLE 1

| | (Unit: W/(m · K)) |
|---|---|
| Base layer (glass substrate) | <1 |
| Metal layer A (ITO) | 5 to 10 |
| Metal layer B (Al) | 236 |

The metal layer B made of Al has the highest thermal conductivity. The polarizer 10 has the same polarization direction as the incident-light polarizing plate 7 facing the backlight device 5 and includes the metal laser 9, which includes thin metal wires of Al, processed to be a wire grid to provide polarization properties. The polarizer 10 is placed between the incident-light polarizing plate 7 and the backlight device 5. This structure reduces the effects on the distribution of the light transmittance of the LCD element 4. The base layer 8 is a glass substrate that can be thicker to block more heat. The base layer 8 being a glass substrate can more easily be thicker than the base layer 8 being a film of a resin material.

For the LCD device 1 according to the present embodiment used in a head-up display (HUD) device, the backlight device 5 has less limitations in its thickness and has priority in its luminance efficiency. The backlight device 5 is mounted, in a stacked manner, immediately below self-luminous light emitters such as light-emitting diodes (LEDs) and electroluminescent (EL) elements. To prevent the light emitters from being exposed, a diffusion film may be placed between the polarizer 10 and the backlight device 5.

Figure 3A:
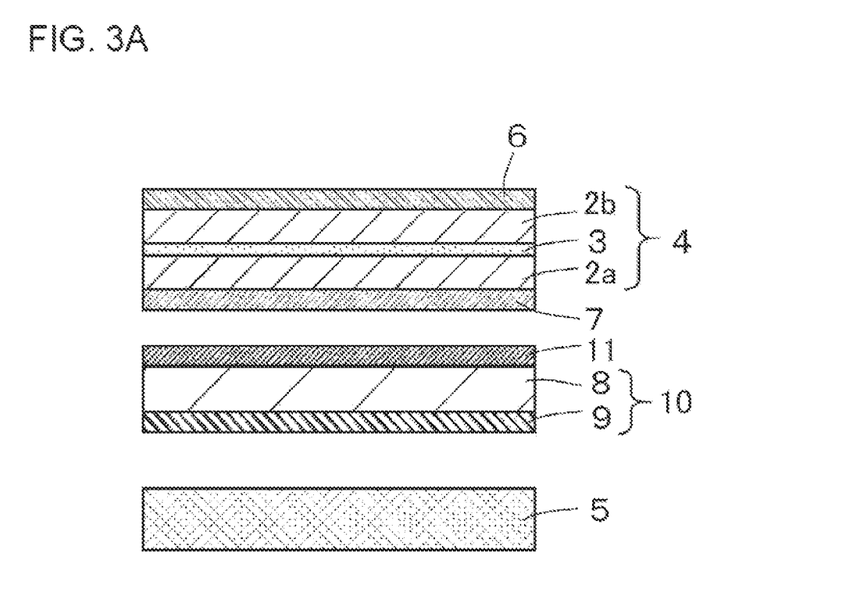
FIG. 3A is a diagram of an LCD device used in a light leakage test, illustrating a design model A with a stacked structure.
Figure 3B:
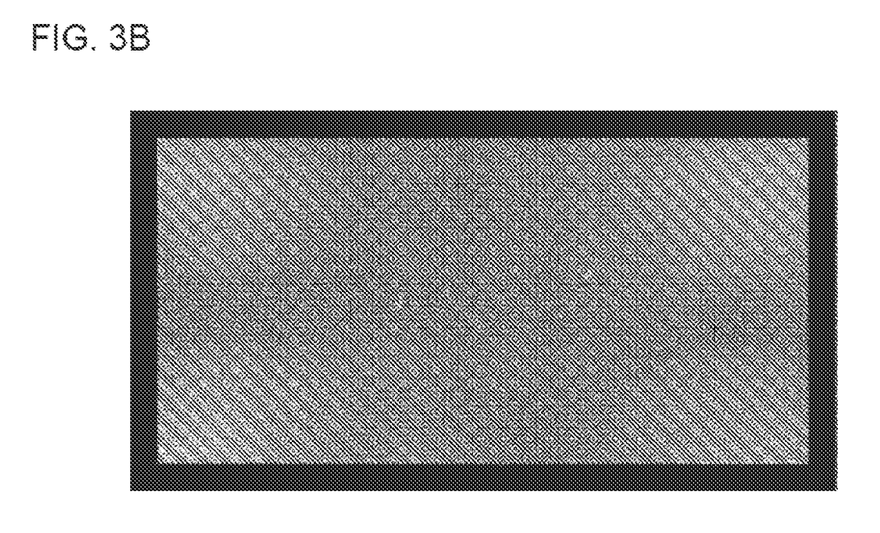
FIG. 3B is a diagram of the LCD device in FIG. 3A, illustrating the display on its display surface as viewed from above.
Figure 4A:
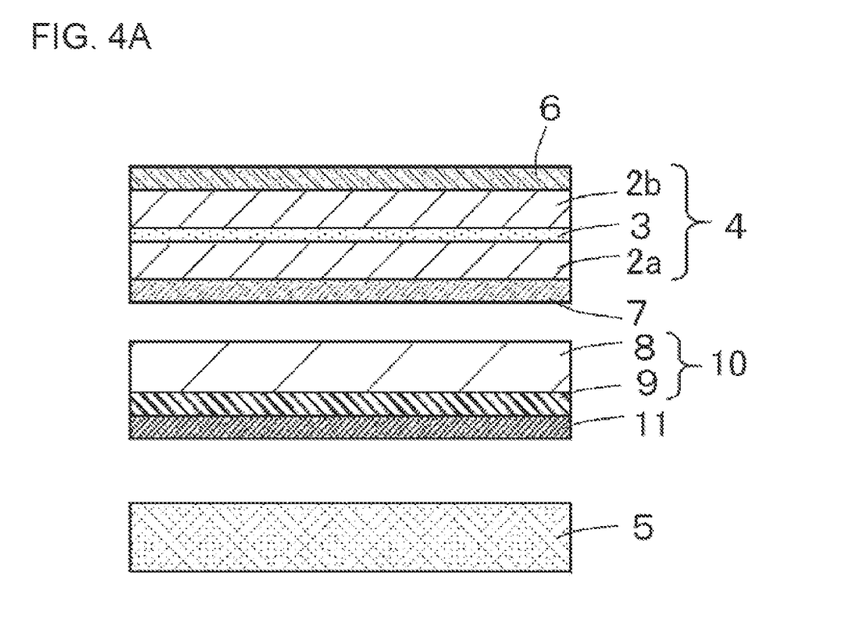
FIG. 4A is a diagram of the LCD device used in the light leakage test, illustrating a design model B with a stacked structure.
Figure 4B:
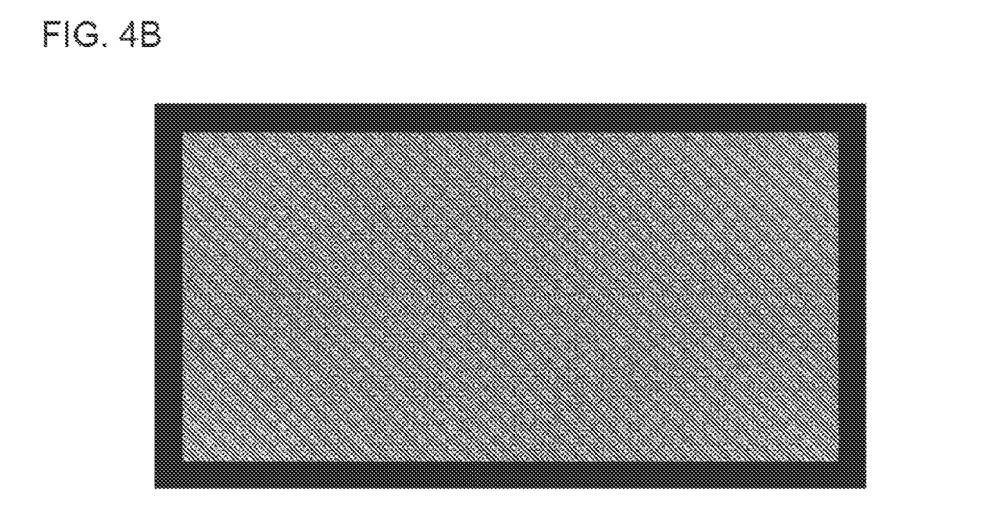
FIG. 4B is a diagram of the LCD device in FIG. 4A, illustrating the display on its display surface as viewed from above.

FIG. 3A is a diagram of an LCD device used in a light leakage test, illustrating a design model A with a stacked structure. FIG. 3B is a diagram of the LCD device in FIG. 3A, illustrating the display on its display surface as viewed from above. FIG. 4A is a diagram of the LCD device used in the light leakage test, illustrating a design model B with a stacked structure. FIG. 4B is a diagram of the LCD device in FIG. 4A, illustrating the display on its display surface as viewed from above.

The inventors conducted the light leakage test on two test samples of type A and type B described below to determine whether light leakage is observed. In the sample of type A, the polarizer 10 including the base layer 8 being a glass substrate and the metal layer 9 facing the backlight device 5 is located between a diffusion film 11 as a light diffuser and the backlight device 5. In this structure, the surface temperature of a surface for emission light of the LCD element 4 decreased, but light leakage was still observed. This may result from the diffusion film 11 with locally higher temperatures, particularly, higher temperatures at the center than at peripheries (four corners).

In the sample of type B, the polarizer 10 including the base layer 8 being a glass substrate and the metal layer 9 facing the backlight device 5 is located between the incident-light polarizing plate 7 and a diffusion film 11. In this structure, the surface temperature of the surface for emission light of the LCD element 4 decreased, and the light leakage was also eliminated. The polarizer 10 includes the glass substrates having a thermal conductivity (0.55 to 0.75 W/(m·K)) higher than the thermal conductivity (0.12 to 0.29 W/(m·K)) of the resin material contained in the diffusion film 11. In addition, the polarizer 10 is nearer the LCD element 4 than the diffusion film 11. The incident-light polarizing plate 7 is thus prevented from having locally higher temperatures.

Figure 5:
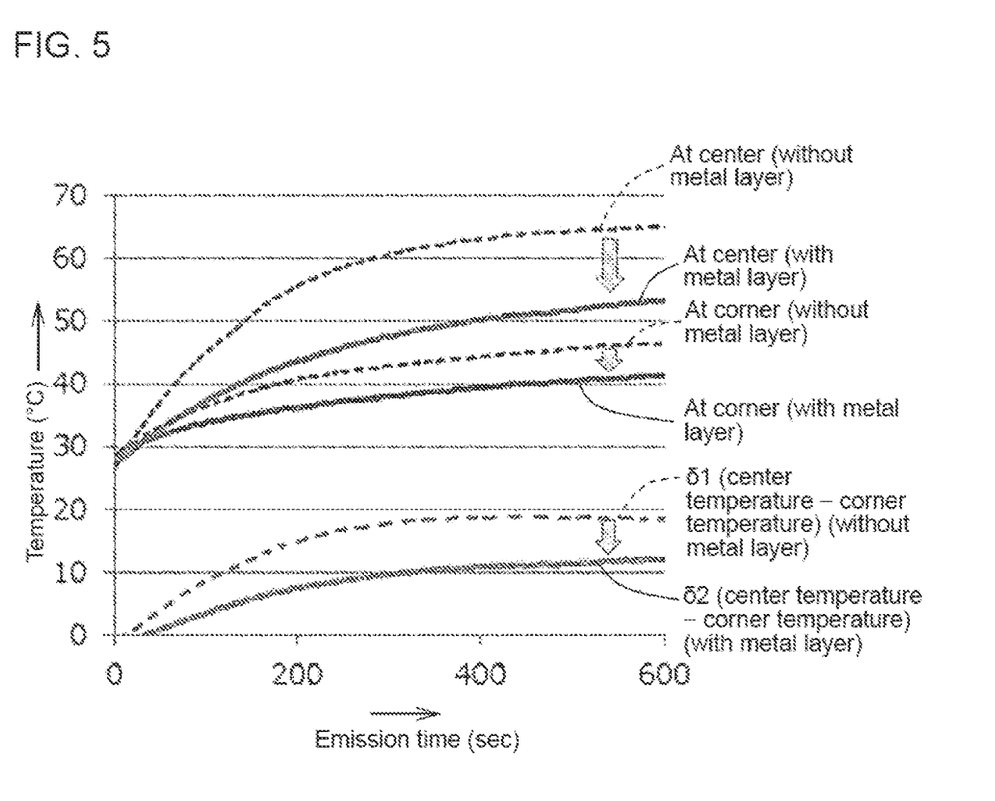
FIG. 5 is a graph showing the temperature measurement results indicating that a metal layer reduces a temperature increase.

FIG. 5 is a graph showing the temperature measurement results indicating that the metal layer 9 reduces a temperature increase. To determine whether the metal layer 9 can reduce the temperature increase in the LCD element 4, the backlight device 5 applied light toward the LCD element 4 with or without the metal layer 9, and the temperature was measured at the center and at a corner of the display surface, which is the surface for emission light of the LCD element 4. The determination was then performed as to whether the temperature was reduced and also about the degree of such temperature reduction. In FIG. 5, 61 indicates the temperature difference between the center and the corner of the display surface without the metal layer 9, and 62 indicates the temperature difference between the center and the corner of the display surface with the metal layer 9.

As in the graph of FIG. 5, the polarizer 10 including the base layer 8 and the metal layer 9 highly effectively reduces the temperature distribution across the display surface in response to the temperature increase.

The LCD device 1 according to the present embodiment is used in an HUD device to project display light to a windshield, which is an example of a projection member attached to a windshield of a vehicle, A viewer, such as a driver, can view the display light projected to the windshield superimposed on a frontward view viewable through the windshield.

The polarizer 10, together with the incident-light polarizing plate 7, can change the amount of light from the backlight device 5 that passes through the LCD device 1. As described above, the polarizer 10 includes the base layer 8 that is mainly a glass substrate. The base layer 8 has the surface nearer the backlight device 5 receiving the thin metal wires 13, which are also referred to as a metal nanowire grid, and including fine metal slits. The polarizer 10 transmits a light component vibrating in a direction along a light transmission axis and reflects a light component vibrating in a direction along a light reflection axis perpendicular to the light transmission axis. More specifically, the polarizer 10 transmits a light component vibrating in a direction orthogonal to the slits (the grid) and reflects a light component vibrating in a direction parallel to the slits (the grid) as illustrated in FIG. 2 described above.

In the present embodiment, the base layer 8 is a glass substrate. In some embodiments, the base layer 8 may be, for example, a transparent resin sheet. A transparent resin refers to a resin having a total light transmittance of 70% or greater when measured using a plate of resin with a thickness of 2 mm and both surfaces being smooth in accordance with JTS K7361-1. Examples include polyethylene, a propylene ethylene copolymer, polypropylene, polystyrene, a copolymer of an aromatic vinyl monomer and a (meth)acrylic acid alkyl ester having a lower alkyl group, polyethylene terephthalate, a terephthaiic acid-ethylene glycol-cyclohexane dimethanol copolymer, polycarbonate, an acrylic resin, and a resin having an alicyciic structure.

Of these, the copolymer of an aromatic vinyl monomer and a (meth)acrylic acid alkyl ester having a lower alkyl group containing more than 10% of polycarbonate, polyethylene, and an aromatic vinyl monomer and a resin having a water absorption of 0.25% or less such as the resin having an alicyclic structure are less likely to deform through absorption of moisture. The base layer 8 made of these resins as a transparent resin can thus have a function equivalent to the function of a large light diffusion layer 11 with less warpage.

The base layer 8 being, for example, a transparent resin substrate or a transparent resin sheet may additionally contain a particulate light diffusing agent. The light diffusing agent includes particles that diffuse light and is broadly divided into an inorganic filler and an organic filler. Examples of the inorganic filler include silica, aluminum hydroxide, aluminum oxide, titanium oxide, zinc oxide, barium sulfate, magnesium silicate, and a mixture of these substances. Examples of the organic filler include an acrylic resin, polyurethane, polyvinyl chloride, a polystyrene resin, polyacrylonitrile, polyamide, a polysiloxane resin, a melamine resin, and a benzoguanamine resin.

The light diffusing agent may be in the shape of, for example, a sphere, a cube, a needle, a rod, a spindle, a plate, a scale, or a fiber. Of these, the light diffusing agent may be in the shape of a sphere that can diffuse light isotropically.

A diffusion film is formed with such a light diffusing agent uniformly dispersed in the film.

For the sample of type B, light emitted from the backlight device 5 passes through the diffusion film (diffuser) 11 and reaches the polarizer 10. The light reaching the polarizer 10 has light components vibrating in the direction along the light transmission axis of the polarizer 10 to pass through the polarizer 10, pass through the incident-light polarizing plate 7, and enter the LCD element 4.

In contrast, light components vibrating in the direction along the light reflection axis of the polarizer 10 are reflected by the polarizer 10.

The light emitted from the backlight device 5 and reflected by the polarizer 10 is diffused by the light diffuser 11 between the polarizer 10 and the backlight device 5, vibrates in a different direction, and thus travels toward the polarizer 10 again. The light reflected by the polarizer 10 is reused, thus increasing the light intensity.

The polarizer 10 may be in contact with a thermal conductor that externally conducts and diffuses heat, such as a metal frame, a metal bezel, and a metal container. For example, the conductive tape 12 may be attached to the periphery of the polarizer 10, or more specifically, the area outside an active display area M. The conductive tape is a rectangular flat film of a highly conductive and thermally conductive metal film, such as a Cu film, applied or formed by vapor deposition to one surface of a resin film with a conductive adhesive.

The conductive tape 12 is a metal film with high thermal conductivity, such as a film of Ag. Cu, or Al, formed by vapor deposition onto one surface of a resin sheet of a resin material, such as an acrylic resin, with a thickness of about 100 to 500 μm. More specifically, the conductive tape 12 may be a metal sheet, which is an example of a radiator sheet. The metal sheet has a thermal conductivity of about 230 to 400 W/(m·K).

The conductive tape 12 may be a graphite sheet with a thickness of about 25 to 100 μm, which is an example of a radiator sheet. The graphite sheet has a thermal conductivity of about 1500 W/(m·K).

As illustrated in FIG. 1, the conductive tape 12 may be attached to the metal layer 9 at the periphery of the polarizer 10. In this case, the conductive tape 12 can effectively receive heat from the metal layer 9 with high thermal conductivity.

Figure 6:
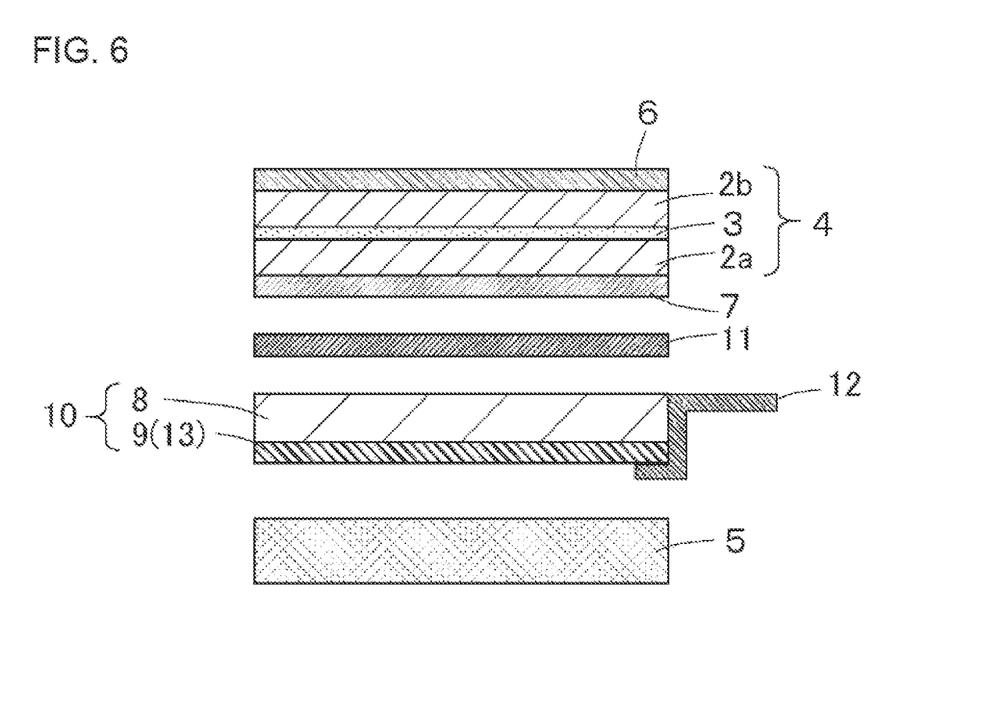
FIG. 6 is a schematic cross-sectional view of an LCD device according to another embodiment of the present disclosure.

As illustrated in FIG. 6, the conductive tape 12 may be attached to the metal layer 9 and a side surface of the base layer 8 at the periphery of the polarizer 10. In this case, the conductive tape 12 is attached to a larger area in the polarizer 10 to more effectively receive heat from the polarizer 10 with high thermal conductivity.

The conductive tape 12 may be attached to the entire periphery of the polarizer 10. In this structure, heat in the polarizer 10 can be uniformly dissipated outside. The conductive tape 12 may also be in contact with the entire periphery of the thermal conductor. In this structure, heat in the polarizer 10 can be uniformly dissipated outside more effectively.

The conductive tape 12 may be light-transmissive. This conductive tape 12 is less likely to affect the display on the LCD element 4. In other words, the display in the LCD element 4 is less likely to have lower light transmission at the periphery and to have lower luminance and lower contrast of an image at the periphery. For the light-transmissive conductive tape 12 being, for example, a metal film formed by vapor deposition onto one surface of a resin film, the metal film is to have a thickness of about 30 nm or less.

More specifically, the thinner metal film absorbs less light. To reduce the absorption of light more effectively, the metal film may have a thickness of about 20 nm or less, or about 3 to 15 nm.

The conductive tape 12 being light-transmissive may not have a light transmittance of 100%, and may have a light transmittance of about 10 to 90%, or about 30 to 70%.

The polarizer 10 may be in contact with the thermal conductor at an end of the metal layer. In this case, the metal layer with high thermal conductivity is in contact with the thermal conductor, thus allowing efficient transfer of heat to the thermal conductor. The metal layer has the end in contact with the thermal conductor. The thermal conductor is thus less likely to affect the display on the LCD element 4. The metal layer may include, at the end, a strip-shaped extension extending in the peripheral direction of the metal layer. The extension may be in contact with the thermal conductor. In this case, the metal layer has a larger contact area with the thermal conductor, thus allowing more efficient transfer of heat to the thermal conductor. To allow the transfer of heat to the thermal conductor more effectively, the metal layer may include the strip-shaped extension at the end across the periphery. The polarizer 10 may be in contact with the thermal conductor at an end of the base layer and the end of the metal layer.

When the metal layer includes the thin metal wires 13, the thin metal wires 13 may each have a portion in contact with the thermal conductor with a width greater than the width of the remaining portion. In this case, the metal layer has a larger contact area in contact with the thermal conductor, thus allowing more efficient transfer of heat to the thermal conductor.

Figure 7:
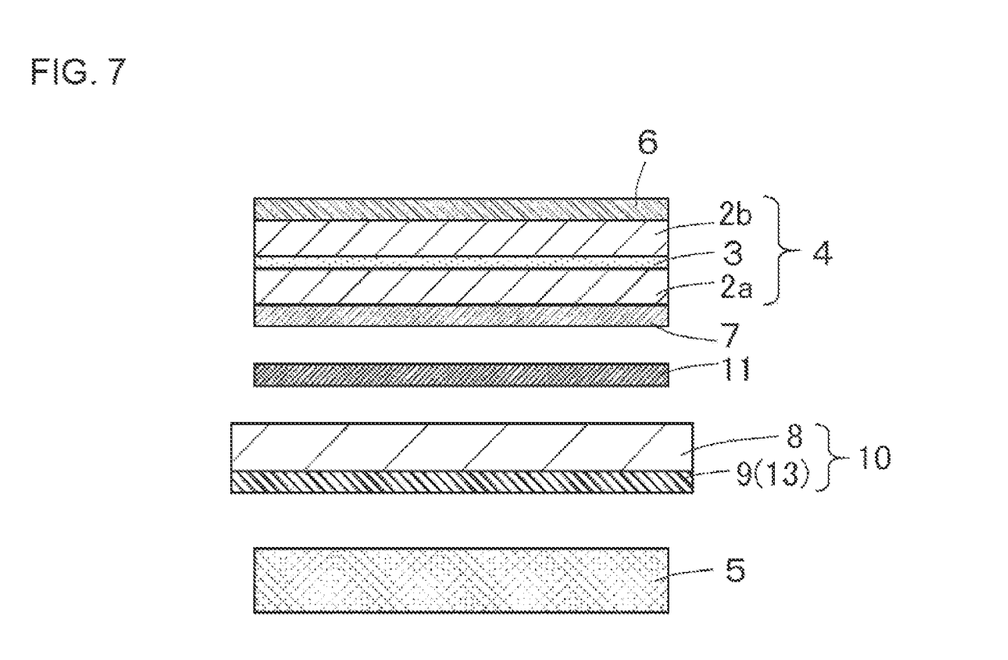
FIG. 7 is a schematic cross-sectional view of an LCD device according to another embodiment of the present disclosure.
Figure 8:
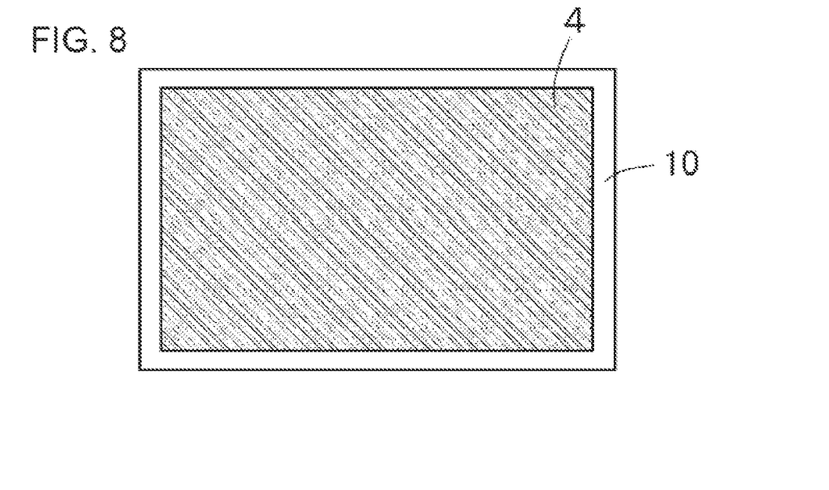
FIG. 8 is a schematic plan view of the LCD device in FIG. 6.

As illustrated in FIGS. 7 and 8, the polarizer 10 may be larger than the LCD element 4 in a plan view. In this case, the polarizer 10 has higher heat capacity. The polarizer 10 receives light emitted from the backlight device 5 and effectively stores radiant heat and provides insulation. As illustrated in FIG. 8, the polarizer 10 may be larger than the LCD element 4 in a plan view and include the LCD element 4 in a plan view. In this case, the polarizer 10 thermally affects the LCD element 4 more uniformly with no bias. In a plan view, the polarizer 10 may have a size (area) larger than the size (area) of the LCD element 4 and is less than or equal to about 1.5 times, or specifically, less than or equal to about 1.3 times the size (area) of the LCD element 4.

The polarizer 10 may be smaller than the LCD element 4 in a plan view and may have a size greater than or equal to the active display area of the display in the LCD element 4. In this case, the polarizer 10 is smaller and lighter. The LCD device 1 is thus lightweight and inexpensive. When the polarizer 10 is in contact with the thermal conductor, the thermal conductor can be relatively larger in a plan view by the reduced size of the polarizer 10 in a plan view. This allows the polarizer 10 to have higher heat dissipation. In this case, the conductive tape 12 may be attached to the side surface of the base layer in the polarizer 10 alone. In this structure, the conductive tape 12 is less likely to affect a display image on the LCD element 4. In a plan view, the polarizer 10 may have a size (area) greater than or equal to about 0.8 times, or specifically, greater than or equal to about 0.9 times the size (area) of the LCD element 4 and smaller than the size (area) of the LCD element 4.

Figure 9A:
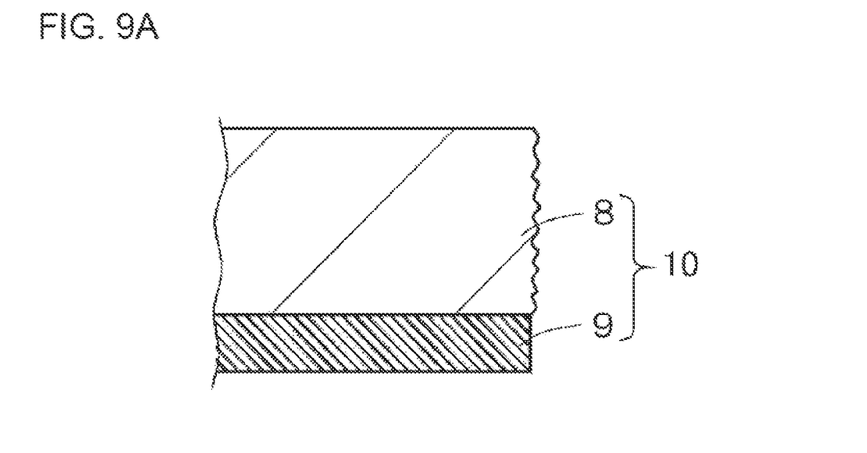
FIG. 9A is an enlarged partial cross-sectional view of a polarizer in an LCD device according to another embodiment of the present disclosure including its side surface.

As illustrated in FIG. 9A, the polarizer 10 may include the base layer 8 having side surfaces with a surface roughness (arithmetic mean roughness) greater than the surface roughness (arithmetic mean roughness) of one main surface (e.g., an upper surface) and the other main surface (e.g., a lower surface). In this case, the base layer 8 has a larger surface area of the side surfaces, thus allowing more efficient heat dissipation. When the base layer S has the side surfaces in contact with the thermal conductor, heat can be transferred to the thermal conductor more efficiently. In this case, the side surfaces of the base layer 8 may be bonded to the thermal conductor with a bond that cures after being applied, such as an adhesive. The bond enters the small irregular portions on the side surfaces of the base layer 8, thus efficiently receiving heat from the side surfaces of the base layer 8. The bond may contain a thermally conductive material, such as metal particles.

Figure 9B:
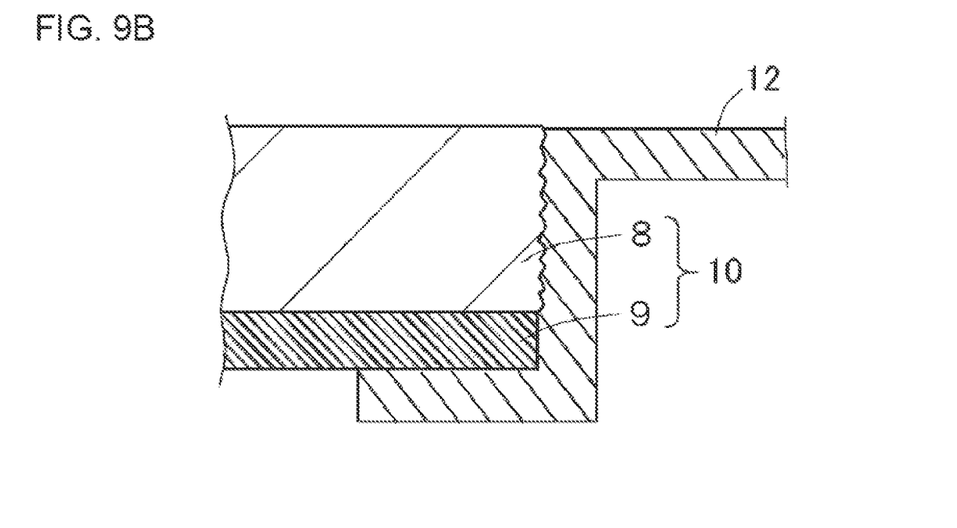
FIG. 9B is an enlarged partial cross-sectional view of a polarizer in an LCD device according to another embodiment of the present disclosure including its side surface.

As illustrated in FIG. 9B, in the polarizer 10, the base layer 8 may have a side surface with the arithmetic mean roughness greater than the arithmetic mean roughness of one main surface and the other main surface, and the metal layer 9 and the side surface of the base layer 8 may be in contact with or bonded to the conductive tape 12. This structure increases the contact area or the bonding area between the side surface of the base layer 8 and the conductive tape 12, thus allowing effective transfer of heat in the polarizer 10 to the conductive tape 12. The conductive tape 12 may be bonded to the side surface of the base layer 8 with a bond material such as an adhesive or a glue. The bond material may contain a thermally conductive material, such as metal particles.

For example, one main surface and the other main surface of the base layer 8 may each have an arithmetic mean roughness of about 1 to 100 nm, and the side surfaces of the base layer 8 may have an arithmetic mean roughness of about 100 to 500 nm. The arithmetic mean roughness can be adjusted by adjusting the grade (a mean grain size) of an abrasive used for grinding a grinding surface, such as an alumina abrasive and a diamond abrasive.

Similarly, the light diffuser 11 may be in contact with the thermal conductor that externally conducts and diffuses heat, such as a metal frame, a metal bezel, and a metal container.

The light diffuser 11 may be in contact with the thermal conductor at its end. This structure reduces the likelihood that the thermal conductor affects the display on the LCD element 4. The light diffuser 11 may include, at the end, a strip-shaped extension extending in the peripheral direction of the light diffuser 11. The extension may be in contact with the thermal conductor. In this case, the light diffuser 11 has a larger contact area with the thermal conductor, thus allowing more efficient transfer of heat to the thermal conductor. To allow the transfer of heat to the thermal conductor more effectively, the light diffuser 11 may include the extension entirely across the periphery.

The emission-light polarizing plate 6 described above is bonded to the surface for emission light of the LCD element 4 with a transparent adhesive. The incident-light polarizing plate 7 described above is bonded to a surface for incident light of the LCD element 4 with a transparent adhesive. The light diffuser 11 described above may be bonded to the incident-light polarizing plate 7 with a transparent adhesive. The polarizer 10 may be bonded to the light diffuser 1 with a transparent adhesive. The bonding is an optical bonding using a photoelastic resin. A transparent optical adhesive, such as an optical clear adhesive (OCA) or an optical clear resin (OCR), may be used as a transparent adhesive.

The OCR may contain a diffusing agent as appropriate. The diffusing agent may be made of any material. An inorganic diffusing agent or an organic diffusing agent can be selectively used as appropriate. The inorganic diffusing agent may be made of, for example, glass, silicon oxide, aluminum hydroxide, aluminum oxide, titanium oxide, zinc oxide, barium sulfate, or magnesium silicate. The organic diffusing agent may be made of, for example, a fluororesin, a polystyrene resin, an acrylic resin, a polycarbonate resin, a silicone resin, a polyethylene resin, an ethylene-vinyl acetate polymer, acrylonitrile, polyurethane, polyvinyl chloride, polyacrylonitrile, polyamide, a polysiloxane resin, a melamine resin, a benzoguanamine resin, or a crosslinked product of these substances and materials. The diffusing agent may be in any shape, and may be in the shape of, for example, a sphere, an ellipse, a cube, a needle, a rod, a spindle, a plate, a scale, or a fiber. Of these, the diffusing agent may be in the shape of a sphere or an ellipse similar to a sphere that can diffuse light isotropically.

The diffusing agent may have a refractive index different from the refractive index of a main polymer used as abase material of an adhesive composition. The refractive index difference may be greater than or equal to 0.05 and less than or equal to 0.15. When the refractive index difference is less than 0.05, the diffusing agent diffuses light insufficiently. When the refractive index difference is greater than 0.15, the diffusing agent diffuses light more effectively, but has a lower transmittance to light obliquely incident to a diffusion adhesive layer, causing darkness as a whole.

The LCD device 1 according to the present embodiment reduces the temperature increase in the LCD element 4 in response to the temperature increase in the backlight device 5, prevents light leakage in a black display of a projected image projected by the LCD device 1, and can display a high-quality image without any lost sense of reality.

Although embodiments of the present disclosure have been described in detail, the present disclosure is not limited to the embodiments described above, and may be changed or varied in various manners without departing from the spirit and scope of the present disclosure. The components described in the above embodiments may be frilly or partially combined as appropriate unless any contradiction arises.

INDUSTRIAL APPLICABILITY

The LCD device according to one or more embodiments of the present disclosure can be used in various electronic devices. Such electronic devices include HUD devices such as AR-HUDs, digital display watches such as smart watches, automobile route guidance systems (car navigation systems), ship route guidance systems, aircraft route guidance systems, smartphones, mobile phones, tablets, personal digital assistants (PDAs), video cameras, digital still cameras, electronic organizers, electronic books, electronic dictionaries, personal computers, copiers, terminals for game devices, television sets, product display tags, price display tags, programmable display devices for industrial use, car audio systems, digital audio players, facsimile machines, printers, automatic teller machines (ATMs), vending machines, head-mounted display devices (HMDs), on-vehicle advertisement display devices for buses and trains, and information displays installed at stations and airports.

REFERENCE SIGNS

1 liquid crystal display device
2a, 2b glass substrate
3 liquid crystal layer
4 liquid crystal display element
5 backlight device
6 emission-light polarizing plate
7 incident-light polarizing plate 8 base layer
9 metal layer
10 polarizer
11 light diffuser
12 conductive tape
13 thin metal wire

The invention claimed is:

1. A liquid crystal display device comprising:
    a liquid crystal display element being light-transmissive, the liquid crystal display element including two transparent substrates and a liquid crystal layer sealed between the two transparent substrates;
    an incident-light polarizing plate on one transparent substrate of the two transparent substrates in the liquid crystal display element;
    a light source configured to emit light toward the one transparent substrate in the liquid crystal display element; and
    a polarizer being a plate and located between the light source and the liquid crystal display element, the polarizer including
    a base layer comprising glass and being thicker than each of the two transparent substrates and
    a metal layer stacked on the base layer and facing the light source, the metal layer being configured to polarize light, and conductive tape attached to a peripheral area of the metal layer.

2. The liquid crystal display device according to claim 1, wherein the base layer has a thickness greater than a total of thicknesses of the two transparent substrates.

3. The liquid crystal display device according to claim 1, wherein the base layer includes a glass substrate.

4. The liquid crystal display device according to claim 1, wherein the base layer comprises a transparent resin containing a particulate light diffusing agent.

5. The liquid crystal display device according to claim 1, wherein the polarizer is spaced apart from the light source.

6. The liquid crystal display device according to claim 1, wherein the polarizer is spaced apart from the liquid crystal display element.

7. The liquid crystal display device according to claim 1, wherein the polarizer is in contact with a thermal conductor.

8. The liquid crystal device according to claim 1, wherein the polarizer is larger than the liquid crystal display element in a plan view.

9. The liquid crystal display device according to claim 1, further comprising:
    a light diffuser between the light source and the incident-light polarizing plate, the light diffuser being configured to diffuse light.

10. The liquid crystal display device according to claim 9, wherein the light diffuser is located between the light source and the polarizer.

11. The liquid crystal display device according to claim 10, wherein the light diffuser is located between the light source and the polarizer with a spacing from the polarizer.

12. The liquid crystal display device according to claim 9, wherein the light diffuser is in contact with a thermal conductor.

13. The liquid crystal display device according to claim 9, wherein the light diffuser is bonded to the incident-light polarizing plate with a transparent adhesive containing a diffusing agent.

14. The liquid crystal display device according to claim 1, wherein the metal layer has a polarization axis parallel to a polarization axis of the incident-light polarizing plate.

15. The liquid crystal display device according to claim 1, wherein the conductive tape is light-transmissive.

16. The liquid crystal display device according to claim 1, wherein the metal layer includes a plurality of thin metal wires arranged in parallel with a spacing from one another.

17. The liquid crystal display device according to claim 1, wherein the metal layer includes at least one selected from the group consisting of Al, Ag, Cu, Ni, and Cr.

18. A liquid crystal display device comprising:
    a liquid crystal display element being light-transmissive, the liquid crystal display element including two transparent substrates and a liquid crystal layer sealed between the two transparent substrates;
    an incident-light polarizing plate on one transparent substrate of the two transparent substrates in the liquid crystal display element;
    a light source configured to emit light toward the one transparent substrate in the liquid crystal display element; and
    a light diffuser between the light source and the incident-light polarizing plate, the light diffuser being configured to diffuse light, wherein the light diffuser is in contact with a thermal conductor;
    a polarizer being a plate and located between the light source and the liquid crystal display element, the polarizer including
    a base layer comprising glass and being thicker than each of the two transparent substrates and
    a metal layer stacked on the base layer and facing the light source, the metal layer being configured to polarize light.

* * * * *